United States Patent Office 2,815,313
Patented Dec. 3, 1957

2,815,313
METHYL-PHENYL-ARSONIC ACID BLACKHEAD CONTROL COMPOSITIONS

Willis C. McGuire, Neal F. Morehouse, Arthur W. Walde, and Harold E. Van Essen, Jr., Charles City, Iowa, assignors to Dr. Salsbury's Laboratories, Charles City, Iowa, a corporation of Iowa No Drawing. Application May 6, 1955,
Serial No. 506,673

15 Claims. (Cl. 167—53.1)

This invention relates to veterinary compositions effective in the control and prevention of blackhead in poultry.

Blackhead is a gastro-intestinal disease of protozoal origin. It occurs in turkeys of all ages and may also affect a wide variety of other avian species, such as chickens, guineas, quails, pheasants and peafowl. To the veterinarian it is known as Histomoniasis and Infectious Enterohepatitis because of its clinical symptoms manifested by an inflammation of the ceca and liver. The etiological factor of the disorder is a microscopic flagellate protozoon identified as *Histomonas meleagridis*. The parasite is mostly harbored by the common poultry cecal worm *Heterakis gallinae*, and its eggs in which it is able to live for long periods of time. It is mainly this source of infection which is responsible for the transmission of the disease.

Birds contract the disease by consuming feed or water contaminated with the droppings containing the infectious organism, or by swallowing cecal worms or their eggs harboring the parasite. Outward manifestations of the disorder are lowering of the head, drooping of the wings, drowsiness, ruffled feathers, dullness, loss of appetite, a constant yellowish or sulfur-colored diarrhea and a slight depression of temperature. As a rule, young poults are susceptible to a rapid onset and short course of the disease, and succumb soon after the appearance of the first symptoms. Adult birds are usually sick for several days before they die and show excessive wasting of flesh. A post-mortem examination exposes multiple ulcerations and lesions of the cecal wall and of the liver. A sticky fluid seeps from the thickened cecal wall, forming yellowish-green cores in the ceca. It has a disagreeable, putrid odor which is the result of tissue destruction. The lesions of the liver consist of irregular, reddened, or gray spots to large necrotic areas. In advanced cases, the peritoneum and mesenteric tissues become involved.

The prognosis of the disease, especially in turkeys, is most unfavorable. Mortality is high and sometimes attains a rate of 100% of the flock. The heaviest losses occur during the first three months of life, but are not limited to that age. Very frequently an outbreak is observed during the breeding season. According to a recent report compiled by the Agricultural Research Service, U. S. D. A., the average annual loss due to turkey mortality from blackhead amounted to $3,815,000 during the years of 1942–1951 which represents a loss of 7.38 cents per turkey for the poultry grower. These figures, however, reflect merely the overall picture of the epidemic damage to the poultry industry. In some regions, marked particularly by heavy rainy and wet growing seasons, such as the Midwest and East, the losses are much more severe and even compel a temporary abandonment of this branch of turkey husbandry.

Apart from conventional sanitary and managerial measures, which are expensive in application and limited in effect, the prevention and control of blackhead has also been attempted by various chemotherapeutic treatments. While some of the suggested drugs, for instance para-nitro phenylarsonic acid and its water soluble salts have shown promising results, their use still fails to provide a fully adequate answer to the blackhead disease problem on account of the cost of the chemicals involved in relation to the high dosage levels at which they must be administered to produce the required effect.

It is, therefore, the object of the present invention to devise an improved therapeutic agent which is superior in potency to the drugs hitherto used and may therefore be employed in lower concentrations to attain the same degree of activity, so as to permit the prevention and control of blackhead in a more economic manner.

We have found that methyl-phenyl arsonic acids and their water-soluble non-toxic salts may be administered by oral ingestion to fowl and particularly to turkeys to effect a chemotherapeutic control of the disease before or during its initial stage. The remedies may be dispensed in any orally ingestible carrier, such as water or feed; they are not unpalatable to the birds, nor are they toxic when used in effective proportions.

The compounds within the purview of this invention may be represented by the general formula

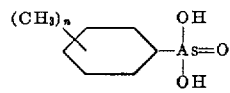

wherein $n$ is a numeral from 1 to 2.

Accordingly, the therapeutic agents contemplated by this invention are phenyl arsonic acid derivatives in which one or two methyl groups are substituted in the benzene ring in various positions, as exemplified by the following compounds:

4-methyl phenyl arsonic acid
3-methyl phenyl arsonic acid
2-methyl phenyl arsonic acid
2,3-dimethyl phenyl arsonic acid
2,4-dimethyl phenyl arsonic acid
2,5-dimethyl phenyl arsonic acid While the description and following examples specifically illustrate the acids for the purpose of this disclosure, it will be understood that their water-soluble, non-toxic salts are likewise included within the scope of this invention and that they shall be covered by the claims as obvious equivalents. Salts of the type as described comprise those of the alkali metals, ammonium, alkaline earth metals, such as calcium and barium, and further copper, iron and cobalt. The equivalence of these salts is predicated upon the theory that the pharmacological activity of the compounds may, at least in part, be centered in the anionic portions of the methyl phenyl arsonic acids. It is, however, not intended that the scope of this invention be restricted to this particular explanation. In principle, therefore, this invention embraces the mono- and dimethyl phenyl arsonic acids and all of their salts which may be effectively used to achieve the desired therapeutic effect in the prevention and control of blackhead disease, including those cations which are not excessively toxic within the useful dosages to be applied.

As previously indicated, the drugs are preferably administered in any medium, carrier, or vehicle which is susceptible of being orally ingested by the bird. Desirable are nutritive materials which are absorbed or taken into the body of the treated bird and which serve for the purpose of growth, work, repair and the general maintenance of the vital functions. These substances may be of organic or inorganic nature. They may consist of feed, such as mash in wet or dry form, mixed mash and all mash; they may also include drinking water, distilled or undistilled, free from or added with accessory factors and supplemental medication.

As will be shown in the following examples and tables, the initial dosage producing significant activity lies at 0.0005% or five parts per million, while higher concentrations show effectiveness of 75 to 100%. A dosage level of as low as 0.0025% or 25 parts per million assured complete protection in almost every run of the tabulated tests.

Altogether, 262 animals were used in the experiments. In each of the tests an even number of Broad Breasted Bronze turkey poults were reared in wire-bottomed cages enclosed in brooding rooms. When these poults were about six-weeks-of-age, they were placed in individual cages, having hardware-cloth bottoms, where they remained for two or three days. This period of isolation allowed the poults to be accustomed to their new quarters, before the tests were started. The lots were thereupon divided into two groups each of equal numbers. One of the groups was placed on medication three days before and eighteen days after infection, while the other group remained untreated and served as controls. The birds were held under observation for additional ten days after medication to determine the extent of possible relapses. All the figures listed in the tables represent the survival rates after the end of the post-medication period.

Artificial infection was carried out by the administration of embryonated eggs of the cecal worm of chickens, known as *Heterakis gallinae*. Approximately 250 eggs per bird were given for three successive days. Treatment was conducted by placing the medicated feed rations and aqueous solutions before the infected birds for ingestion ad libitum. During all the experiments weight-, feed-, and water-consumption records were kept on each poult under test. It was found that at the dosage levels administered no detrimental effect on the natural growth or weight increase of the birds was caused by the active ingredients of the compositions.

The following Tables I and II summarize the results of our experimental investigation. Table I shows the number of survivors in an artificially infected group of poults which was treated with varying concentrations of several methyl phenyl arsonic acids in aqueous preparations as compared with the survival rate of an equal number of infected untreated controls. Table II presents corresponding data for the treatment in the feed.

Table I

| Phenyl arsonic acid derivative | Dosage, percent | Number of Poults | | Number of Survivors | |
|---|---|---|---|---|---|
| | | Treated | Controls | Inf. Treated | Inf. Controls |
| 4-methyl | 0.0005 | 4 | 4 | 2 | 0 |
| | 0.0020 | 4 | 4 | 4 | 0 |
| | 0.0026 | 8 | 8 | 8 | 1 |
| | 0.0030 | 4 | 4 | 4 | 0 |
| 3-methyl | 0.0010 | 4 | 4 | 3 | 0 |
| | 0.0025 | 4 | 4 | 4 | 1 |
| 2-methyl | 0.0020 | 4 | 4 | 4 | 0 |
| 2,3-dimethyl | 0.0025 | 4 | 4 | 4 | 0 |
| 2,4-dimethyl | 0.0050 | 4 | 4 | 4 | 0 |
| 2,5-dimethyl | 0.0050 | 4 | 4 | 4 | 0 |

Table II

| Phenyl arsonic acid derivative | Dosage, percent | Number of Poults | | Number of Survivors | |
|---|---|---|---|---|---|
| | | Treated | Controls | Inf. Treated | Inf. Controls |
| 4-methyl | 0.0005 | 4 | 4 | 2 | 0 |
| | 0.0010 | 4 | 4 | 4 | 0 |
| | 0.0025 | 4 | 4 | 4 | 0 |
| | 0.0050 | 4 | 4 | 4 | 0 |
| 3-methyl | 0.0005 | 4 | 4 | 2 | 1 |
| | 0.0010 | 4 | 4 | 4 | 1 |
| | 0.0025 | 4 | 4 | 4 | 1 |
| | 0.0050 | 4 | 4 | 4 | 1 |
| 2-methyl | 0.0020 | 4 | 4 | 4 | 0 |
| 2,3-dimethyl | 0.0050 | 7 | 7 | 7 | 2 |
| | 0.0050 | 4 | 4 | 4 | 0 |
| 2,4-dimethyl | 0.0010 | 8 | 8 | 6 | 2 |
| | 0.0050 | 8 | 8 | 8 | 2 |
| | 0.0070 | 8 | 8 | 8 | 2 |
| 2,5-dimethyl | 0.0013 | 4 | 4 | 4 | 0 |
| | 0.0050 | 4 | 4 | 4 | 0 |
| | 0.0050 | 4 | 4 | 3 | 0 |
| | 0.0060 | 4 | 4 | 4 | 0 |

It should be noted that the methyl-phenyl arsonic acids and their salts are completely effective as prophylactic control agents when used alone. For practical purposes in the field, however, it is frequently desirable to compound the remedies into preformulated concentrates in tablet-, powder-, or similar dosage form which can be easily dispensed and incorporated into the vehicle in the proper therapeutically active proportions. A tablet of 1.100 grams (17 grains) adapted for dissolution in drinking water, for example may be composed as follows:

| | Grams |
|---|---|
| Methyl-phenyl arsonic acid | [1] 0.038 |
| Ammonium phenolsulphonate | 0.465 |
| Sodium phenolsulphonate | 0.465 |
| Boric acid | 0.132 |
| | 1.100 |

[1] 0.0034%.

The phenolsulphonates are used in the formulation as binders to assure ready dissolution in the water. Boric acid serves as a lubricant to facilitate the punching of the tablet. One tablet of this composition, when dissolved in one gallon of water, will provide a concentration of 0.001% or ten parts per million of the active ingredient, sufficient to afford protection in a measure of 75 to 100% in young birds, if administered to the flock at the first sign of the disease. For older animals a concentration of three to five tablets is recommended to assure 100% prevention.

A powder composition for incorporation into the feed may, for example be compounded as follows:

| | Percent |
|---|---|
| Methyl-phenyl arsonic acid | 5 |
| Kaolin | 95 |
| | 100 |

A preferred dose of one pound of powder composition in every 1000 lbs. of an all mash ration is a suitable feed mixture containing about 0.005% of the active ingredient, sufficient to give 100% protection. To secure an even distribution, the powder is compounded with a small amount of mash as a pre-mix which is then blended into the bulk of the feed with thorough mixing.

As previously stated, the methyl-phenyl arsonic acids and their non-toxic water soluble salts may also be administered in various other combinations adapted for oral ingestion, such as special diets or rations consisting of proteins, fats, oils, carbohydrates, or mineral materials, gelatine, yeast, brans, grains and fibrous matter. The medicaments may be incorporated therein in their desired strength. They may also be combined with other drugs, adjuvants, accessory factors or dietary supplements, and

What we claim is:

1. A composition effective in the control of blackhead in poultry during its initial stage comprising an element of poultry sustenance selected from the group consisting of feed and water containing a small, but effective non-toxic amount of a compound selected from the group consisting of monomethyl-phenyl arsonic acids, dimethyl-phenyl-arsonic acids, water-soluble, non-toxic salts of said acids and mixtures thereof, said compound being present in an amount approximately between 0.0005% and 0.0007% by weight of the composition.

2. A composition effective in the control of blackhead in poultry during its initial stage according to claim 1, wherein the element of poultry sustenance is a poultry ration.

3. A composition effective in the control of blackhead in poultry during its initial stage according to claim 1, wherein the element of poultry sustenance is a drinking water preparation.

4. A composition effective in the control of blackhead in poultry during its initial stage according to claim 2, wherein the chemotherapeutic agent is 4-methyl-phenyl arsonic acid.

5. A composition effective in the control of blackhead in poultry during its initial stage according to claim 2, wherein the chemotherapeutic agent is 3-methyl-phenyl arsonic acid.

6. A composition effective in the control of blackhead in poultry during its initial stage according to claim 2, wherein the chemotherapeutic agent is 2-methyl-phenyl arsonic acid.

7. A composition effective in the control of blackhead in poultry during its initial stage, according to claim 2, wherein the chemotherapeutic agent is 2,4-dimethyl-phenyl arsonic acid.

8. A composition effective in the control of blackhead in poultry during its initial stage according to claim 2, wherein the chemotherapeutic agent is 2,5-dimethyl-phenyl arsonic acid.

9. A composition effective in the control of blackhead in poultry during its initial stage according to claim 3, wherein the chemotherapeutic agent is 4-methyl-phenyl arsonic acid.

10. A composition effective in the control of blackhead in poultry during its initial stage according to claim 3, wherein the chemotherapeutic agent is 2-methyl-phenyl arsonic acid.

11. A composition effective in the control of blackhead in poultry during its initial stage according to claim 3, wherein the chemotherapeutic agent is 3-methyl-phenyl arsonic acid.

12. A composition effective in the control of blackhead in poultry during its initial stage according to claim 3, wherein the chemotherapeutic agent is 2,4-dimethyl-phenyl arsonic acid.

13. A composition effective in the control of blackhead in poultry during its initial stage according to claim 3, wherein the chemotherapeutic agent is 2,5-dimethyl-phenyl arsonic acid.

14. A composition effective in the control of blackhead in poultry during its initial stage in readily dispensable dosage form consisting of a water-soluble tablet containing at least 0.0034% by weight of a compound selected from the group consisting of monomethyl-phenyl arsonic acids, dimethyl-phenyl arsonic acids, water-soluble non-toxic salts of said acids and mixtures thereof, the remainder of said tablet being composed of lubricating and binding ingredients.

15. A composition effective in the control of blackhead in poultry during its initial stage in readily dispensable pulverulent dosage form consisting of a clay containing at least 5% by weight of a compound selected from the group consisting of monomethyl-phenyl arsonic acids, dimethyl-phenyl arsonic acids, non-toxic salts of said acids and mixtures thereof.

References Cited in the file of this patent

UNITED STATES PATENTS 2,638,432    Morehouse          May 12, 1953

OTHER REFERENCES

Fan: J. Econ. Entomology, vol. 40, 1947, pp. 883–895, pp. 883–887 relied upon.

Frankel: Die Arzneimittel-Synthese, 1927, p. 705, Julius Springer (Berlin).

UNITED STATES PATENT OFFICE

CERTIFICATE OF CORRECTION

Patent No. 2,815,313  December 3, 1957

Willis C. McGuire et al.

It is hereby certified that error appears in the printed specification of the above numbered patent requiring correction and that the said Letters Patent should read as corrected below.

Column 5, line 14, for "0.0007%" read -- 0.007% --.

Signed and sealed this 4th day of February 1958.

(SEAL)
Attest:
KARL H. AXLINE

Attesting Officer

ROBERT C. WATSON
Commissioner of Patents